(12) United States Patent
Schuetz

(10) Patent No.: US 7,891,886 B2
(45) Date of Patent: Feb. 22, 2011

(54) DEVICE FOR A MOTOR VEHICLE, COMPRISING A ROTATABLY MOUNTED CAMERA UNIT

(75) Inventor: Heiko Schuetz, Velbert (DE)

(73) Assignee: HUF Hulsbeck & Furst GmbH & Co. KG (DE)

( * ) Notice: Subject to any disclaimer, the term of this patent is extended or adjusted under 35 U.S.C. 154(b) by 0 days.

(21) Appl. No.: 12/445,041

(22) PCT Filed: Oct. 5, 2007

(86) PCT No.: PCT/EP2007/060585

§ 371 (c)(1),
(2), (4) Date: Aug. 19, 2009

(87) PCT Pub. No.: WO2008/043713

PCT Pub. Date: Apr. 17, 2008

(65) Prior Publication Data

US 2010/0040361 A1 Feb. 18, 2010

(30) Foreign Application Priority Data

Oct. 9, 2006 (DE) .................. 10 2006 048 373

(51) Int. Cl.
*G03B 17/00* (2006.01)
(52) U.S. Cl. .................. 396/427; 396/448; 348/148
(58) Field of Classification Search ......... 396/427–428, 396/448; 348/118, 148
See application file for complete search history.

(56) References Cited

U.S. PATENT DOCUMENTS

2003/0146831 A1* 8/2003 Berberich et al. .......... 340/461

(Continued)

FOREIGN PATENT DOCUMENTS

DE 102004050297 4/2006

(Continued)

OTHER PUBLICATIONS

International Search Report; PCT/EP2007/060585; Nov. 18, 2008.

*Primary Examiner*—Christopher E Mahoney
*Assistant Examiner*—Dennis Hancock
(74) *Attorney, Agent, or Firm*—Cantor Colburn LLP

(57) ABSTRACT

The invention relates to a device for a motor vehicle, comprising a rotatably mounted camera unit (10) which can be brought into an inactive position and into an active position by means of a motor, and a protective element (20) that can be rotatably guided about a first axis (21) into a closed position and into an open position, the camera unit (10), in the closed position, being in its inactive position behind the protective element (20) and inaccessible from the exterior, and, in the open position of the protective element (20), the camera unit (10) assuming the active position for recording images. The invention is characterized in that the camera unit (10) can be displaced from the inactive position into the active position about a second axis (11), arranged at a distance to the first axis (21), the protective element (20) is connected to the first axis (21) via a swivel arm (22), and the motor drives a mechanism (30), mounted on the motor vehicle, which is mechanically connected both to the protective element (20) and to the camera unit (10). The mechanism (30) is configured in such a manner that the camera unit (10) is decoupled from the mechanism when it is in the operating state and that the protective element (20) can be displaced from the closed position to the open position, the camera unit (10) remaining in the inactive position.

15 Claims, 2 Drawing Sheets

U.S. PATENT DOCUMENTS

| | | | |
|---|---|---|---|
| 2008/0267612 A1* | 10/2008 | Harvey | 396/428 |
| 2009/0231430 A1* | 9/2009 | Buschmann et al. | 348/148 |
| 2009/0309971 A1 | 12/2009 | Schuetz | |

FOREIGN PATENT DOCUMENTS

| | | |
|---|---|---|
| DE | 202005017430 | 9/2006 |
| JP | 08 150875 | 6/1996 |
| JP | 11 334471 | 12/1999 |
| WO | 2004/012962 | 2/2004 |
| WO | 2008/022717 | 2/2008 |

* cited by examiner

DEVICE FOR A MOTOR VEHICLE, COMPRISING A ROTATABLY MOUNTED CAMERA UNIT

FIELD OF THE INVENTION

The invention relates to a device for a motor vehicle, having a rotatably mounted camera unit, which can brought into a resting position and into an active position by a motor, and having a protective element that is guidable into a closed position and into an open position by rotation about a first axle, such that in the closed position the camera unit is in its resting position behind the protective element, where it is inaccessible from the outside, and in the open position of the protective element the camera unit can be moved into its active position for recording images.

BACKGROUND OF THE INVENTION

The use of cameras for vehicle environment detection is known. Such cameras are used, for example, as parking aids and/or maneuvering aids for motor vehicles to detect the areas that cannot be observed using conventional mirrors in particular.

EP 1 529 688 A1 discloses a camera arrangement for motor vehicles having a camera unit for recording images, whereby the camera unit is arranged behind a pivotable protective element, so that in an inactive position it is essentially inaccessible from the outside. With this device, the camera unit is mounted directly on the protective element. It has been found to be a disadvantage that direct mounting of the camera on the protective element is susceptible to faults. Due to the effects of weather and wear phenomena, the protective element no longer forms a satisfactory seal after a certain period of time, so that the camera mounted on the protective element is exposed to certain dirt and moisture burdens. The lenses of the video camera in particular must therefore be cleaned frequently. Furthermore, because of its arrangement the camera is easily vandalized, e.g., by destroying the protective element.

BRIEF SUMMARY OF THE INVENTION

The present invention creates a device for a motor vehicle having a rotatably mounted camera unit, which avoids the above-mentioned disadvantages, in particular having a greater functionality which allows effective protection of the camera unit without restricting the quality of the images recorded.

According to the present invention, it is provided that the camera unit is movable out of the resting position into the active position by rotating about a second axle, which is arranged at a distance from the first axle. The protective element is connected by a pivot arm to the first axle, and the motor drives a mechanism on the vehicle that is mechanically connected to the protective element as well as the camera unit, whereby the mechanism is designed so that in an operating state, the camera unit is uncoupled from the mechanism, and a movement of the protective element from the closed position into the open position can be performed in such a way that the camera unit remains in the resting position.

With the inventive device, the camera unit is mounted on the vehicle and is in a protected position in its resting position. Even when the protective element is moved from its closed position into its open position, the camera unit initially remains in its resting position. In a defined open position of the protective element, the mechanism moves the camera unit with a time lag into the active position in which the camera unit can be used for recording images. Through intentional separation of the motion sequences of the protective element and the camera unit, the two moving elements are effectively prevented from colliding. Only when the protective element is in a defined open position is the camera pivoted outward. It is also advantageous that malicious opening of the protective element does not lead to any movement of the camera out of its protected resting position, so that damage to the camera unit can be effectively prevented.

According to the invention, the mechanism is designed as a gear which has a driving element on which the motor acts, a coupling element and a driven element, which acts on the first axle. The coupling element is advantageously arranged between the driven element and the driving element. In this case, the coupling element may be connected to the driving element with an articulated joint, thereby achieving a compact gear.

In one possible embodiment, the driving element is rotatably mounted on an axle by which the motor introduces a rotational movement into the mechanism. The driving element transmits this rotational movement introduced by the motor to the coupling element which at the same time drives the driven element on which the pivot arm of the protective element is arranged. Consequently, the pivot arm moves about the first axle and guides the protective element from the closed position into the open position. The driven element and the pivot arm preferably form a uniform part which is mounted to rotate about the first axle.

The driving element advantageously has activation means that act on the camera unit in a coupled operating state of the mechanism, so that the camera unit can be moved from the resting position into the active position and, in the uncoupled operating state of the mechanism, is at a defined distance from the camera unit. In the resting position of the camera unit and in the closed position of the protective element, the mechanism is in an uncoupled operating state. If a movement is introduced by the motor into the mechanism, there is first a movement of the protective element into its open position, whereby the activating means do not yet exert any force on the camera unit to move it out of its resting position. Only in the defined open position of the protective element do the activating means move the camera unit out of its resting position into the active position, whereby the protective element moves into another open position at the same time. The activating means may be designed as a pivot arm, such that the pivot arm and the driving element may be embodied as a uniform component made of the same material.

In one possible embodiment of the invention, the camera unit may have a force application area on which the activating means act in the coupled operating state of the mechanism. The activating means and the force application area are advantageously arranged in relation to one another so that in the uncoupled operating state, a movement of the protective element from the closed position into the open position can be implemented until the mechanism changes to the coupled state and initiates with a time lag a movement of the camera unit from the resting position into the active position in relation to the movement of the protective element. The force application area of the camera unit may be embodied as a type of cam, which is mounted on the second axle about which the camera unit can be pivoted from its resting position into its active position. While the camera unit is pivoting, the activating means slide on the cam, which pivots the camera unit toward the outside. The cam here is fixedly connected to the camera unit.

In a preferred embodiment of the present invention, the coupling element is situated on the driven element in such a way that by manual movement of the protective element from the closed position into the open position, the driven element is uncoupled from the coupling element without initiating a movement of the coupling element. This effectively prevents the camera unit from being moved outward by malicious opening of the protective element at the same time.

According to another measure which increases the functionality, the mechanism is arranged within a housing unit in which a lock cylinder for a lock of a locking device is rotatably mounted, whereby the lock cylinder is completely covered in the closed position of the protective element. The inventive device may thus also be used for a moving part of a motor vehicle, in particular a door, a tailgate, a trunk lid or the like within the context of a mechanical emergency unlocking operation. The lock cylinder is in the normal situation effectively covered by the protective element. If the locking device, e.g., the central lock system has failed, access to the lock cylinder is possible for the user by manual opening of the protective element. Because of the inventive mechanism, however, the camera unit is not pivoted out of its resting position by manual opening of the protective element. Manual opening of the lock can be induced by operation of the lock cylinder.

BRIEF DESCRIPTION OF THE FIGURES

Additional advantages, features and details of the present invention are derived from the following description, in which one exemplary embodiment of the present invention is described in detail with reference to the drawings. The features mentioned in the claims and in the description may be essential to the invention either individually or in any combination.

DETAILED DESCRIPTION OF THE INVENTION

Figure 1:
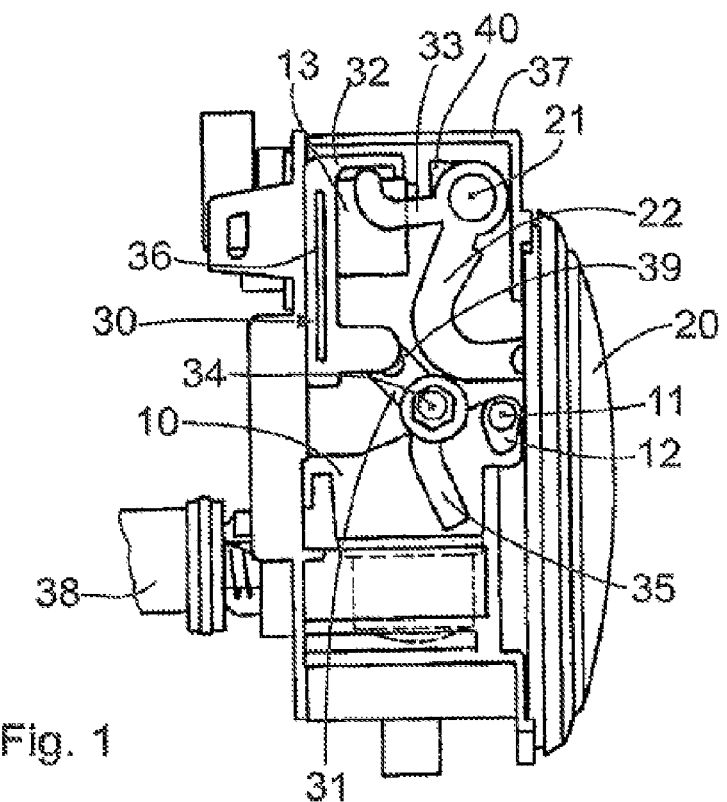
FIG. 1 shows the inventive device, whereby the camera unit is in its resting position and the protective element is in the closed position.
Figure 2:
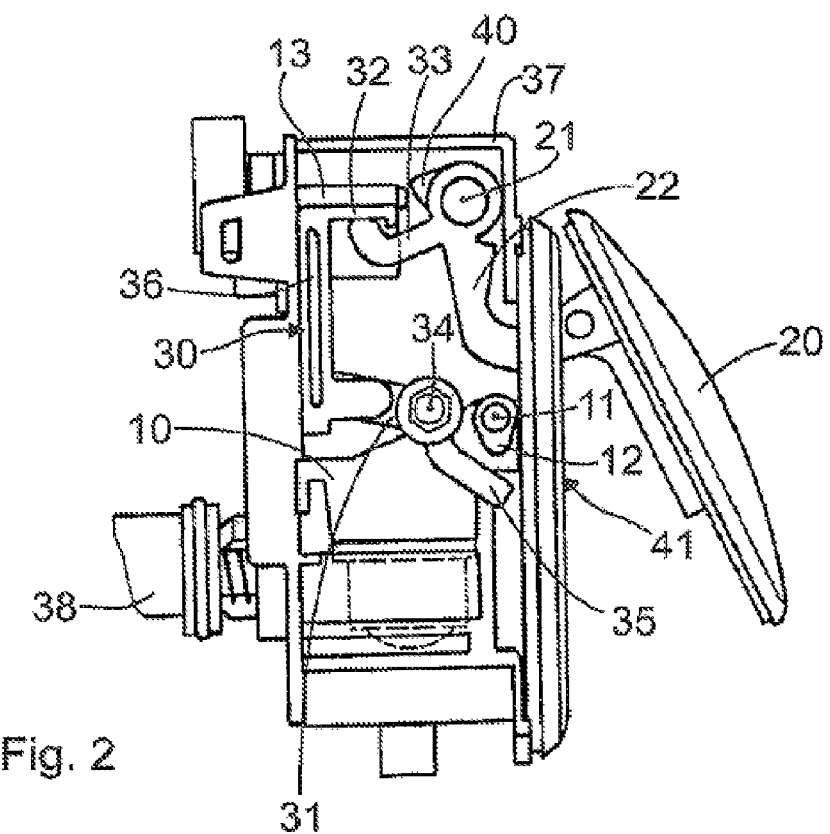
FIG. 2 shows the device according to FIG. 1, whereby the protective element is in a first open position.

FIGS. 1 to 4 show a possible embodiment of the inventive device for a motor vehicle with a rotatably mounted camera unit 10. The camera unit 10 can be brought into a resting position (see FIG. 1, FIG. 2 and FIG. 4) and into an active position (see FIG. 3) by means of a motor (not shown). In addition, the device has a protective element 20 in the form of a cover, which is rotatably movable about an axle 21. In FIG. 1 the protective element 20, is in a closed position. In the other diagrams, the protective element 20 is an open position.

The camera unit 10 is inside a housing unit 37 and can be moved out of the resting position into the active position about a second axle 11, which is arranged at a distance from the first axle 21. According to the invention, the protective element 20 is connected to the first axle 21 by a curved pivot arm 22. Furthermore, a mechanism 30 which can be driven by the motor and is connected mechanically to the protective element 20 and also to the camera unit 10 is provided inside the housing unit 37. The mechanism 30 here is designed as a gear, which has a driving element 31, a coupling element 32 and a driven element 33. The motor acts on the driving element 31. The driven element 33 is made of the same material and is connected in one piece to the pivot arm 22. The coupling element 32 is situated between the driven element 33 and the driving element 31, such that the coupling element 32 is connected to the driving element 31 with an articulated joint. As the figures show, the driving element 31 is mounted to rotate on an axle 34 by means of which the motor initiates a rotational movement in the mechanism 30. The coupling element 32 is designed with a groove 36 embodied in a linear form. In addition, the coupling element 32 is additionally guided to execute a translatory movement on the driving element 31. To do so, a linear groove 39 is provided on the driving element 31, in which the coupling element 32 engages at one end. While the driving element 31 moves about the rotational axle 34, the coupling element 32 is guided along a translatory guide, engaging in the groove 36. At the same time, the end of the coupling element 32, which cooperates with the driving element 31, is displaced along the groove 39.

The driving element 31 is designed with activation means 35 in the form of a pivot arm 35. In addition, the camera unit 10 is designed with a force application area 12 in the form of a cam, which is mounted on the second axle 11. A lock cylinder 38 for the lock of a locking device, in particular a central lock system of a motor vehicle, is rotatably mounted in the housing unit 37. A switch element 13, which can be activated by a movement of the protective element 20 and triggers a signal for electric opening of the lock, is mounted at the height of the first axle 21. In the present exemplary embodiment, the switch element 13 is a microswitch that can be activated by a cam 40 which moves with the pivot arm 22.

If the motor is activated, e.g., by putting it into a reverse gear, there is a rotational movement of the driving element 31 counterclockwise about the axle 34. The mechanism 30 is thus moved out of its starting position as illustrated in FIG. 1, such that the coupling element 32 is moved downward in a linear path and at the same time approaches the axle 34 with its lower end along the groove 39. The coupling element 32 is designed in the form of an L or a hook on its second end which faces the driven element 33. The driven element 33 here is in contact only with the coupling element 32. Due to the translatory movement of the coupling element 32, the driven element 33, which is designed in the form of a curve, is pivoted counterclockwise about the axle 21. At the same time, the pivot arm 22 rotates about the axle 21 and causes the protective element 20 to be moved from its closed position into an open position. The housing unit 37 has an opening 41 through which the pivot arm 22 in FIG. 2 protrudes.

At the same time, the pivot arm 35 moves in the direction of the cam 12 of the camera unit 10. While the protective element 20 is pivoted outward about the axle 21, the camera unit 10 remains in its resting position. This uncoupled operating state of the mechanism 30 changes exactly when the pivot arm 35 comes in contact with the cam 12 of the camera 10 illustrated in FIG. 3. As this shows, the camera unit 10 is moved from its resting position into the active position by the pivot arm 35 acting on it.

Figure 4:
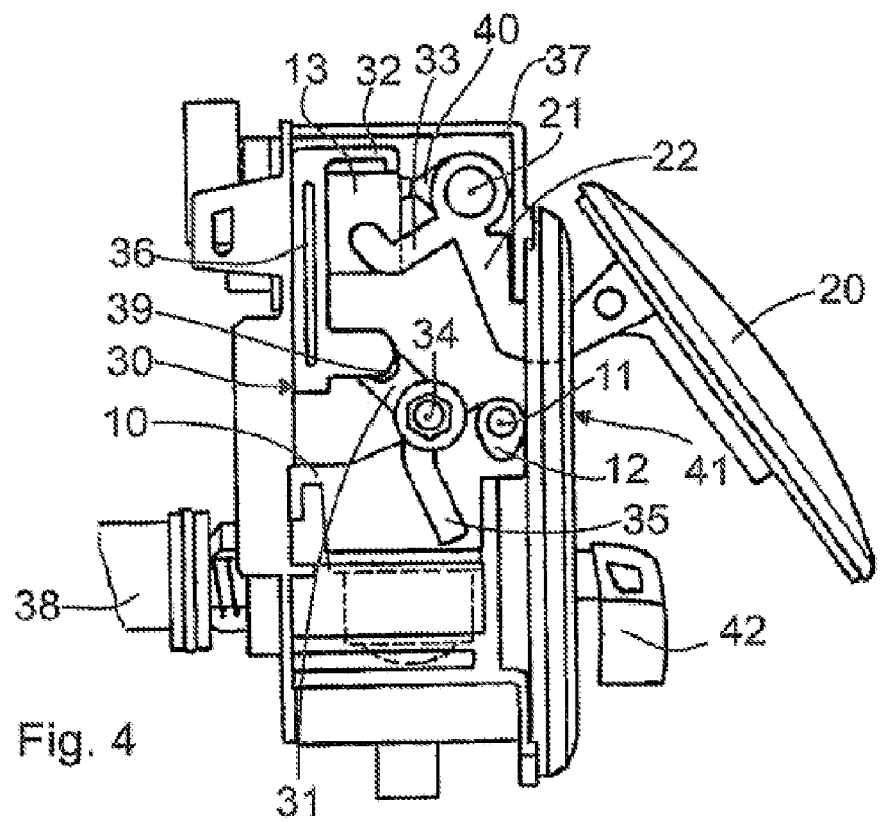
FIG. 4 shows the device according to FIG. 1, whereby the protective element has been moved manually into an open position.

FIG. 4 illustrates the inventive device in which the protective element 20 has been moved manually into an open position for an emergency situation in which the complete automotive electronic system has failed. By means of an emergency key 42, which is in the lock cylinder 38, a lock on the locking device, which is in operative connection with the lock cylinder 38, can be opened manually. In the closed position of the protective element 20 (see FIG. 1), the lock cylinder 38 is completely covered.

Figure 3:
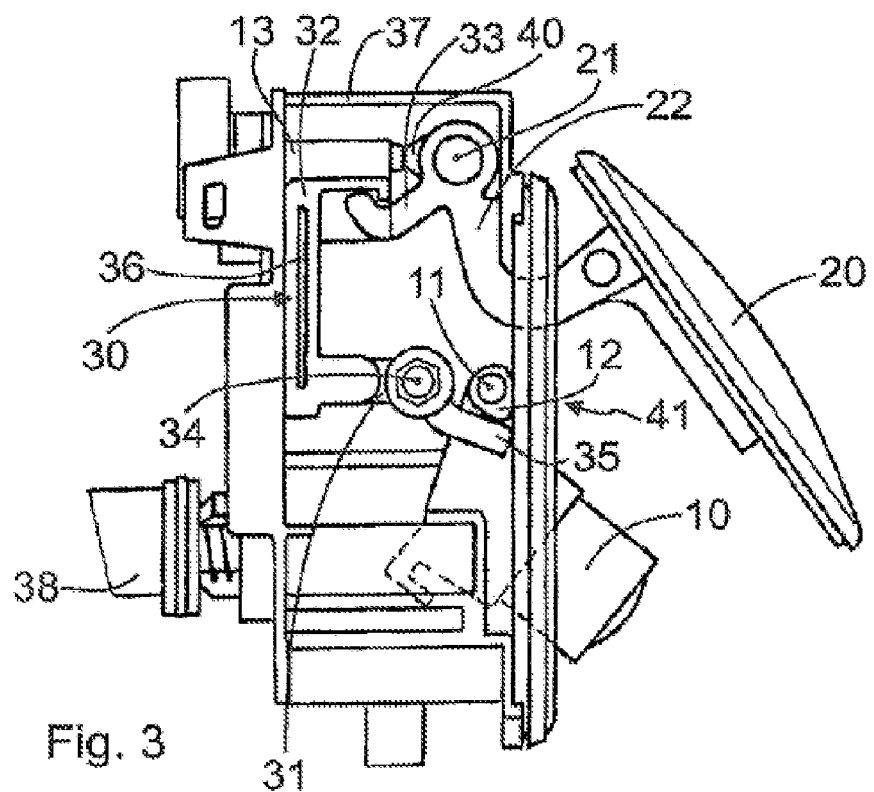
FIG. 3 shows the device according to FIG. 1, whereby the protective element is in another open position and the camera unit assumes the active position.

The exemplary embodiment shown here may also be achieved for electric opening of the lock. In the area of the axle 21, there is a cam 40 which moves with the pivot arm 22 and is moved during manual movement of the protective element 20 into an open position in the direction of the switch element 13 at a distance. In FIG. 3 the cam 40 contacts the switch element 13, which sends a signal for electronic opening of the lock. The inventive device is arranged on a tailgate, for example, so that the switch element 13 can electronically open the tailgate lock and the operator can pull on the protective element 20, for example, to raise the tailgate and thus open it. It is especially advantageous that for the electric or manual opening of the lock, the camera unit 10 is uncoupled due to the corresponding design of the mechanism 30 and remains protected in the resting position.

The invention claimed is:

1. A device for a motor vehicle, comprising a rotatably mounted camera unit, which can be guided into a resting position and into an active position by a motor, and a protective element which can be guided into a closed position and into an open position by rotating about a first axle, whereby in the closed position the camera unit is in its resting position, in which it is inaccessible from an outside and is protected behind the protective element, and in the open position of the protective element the camera unit can be moved into the active position for recording images, wherein the camera unit is movable out of the resting position into the active position about a second axle arranged at a distance from the first axle; the protective element is connected by a pivot arm to the first axle; and the motor drives a mechanism on the vehicle which is mechanically connected to the protective element as well as to the camera unit, such that the mechanism is designed so that in an operating state the camera unit is uncoupled from the mechanism and a movement of the protective element from the closed position into the open position can be performed, while the camera unit remains in the resting position.

2. The device according to claim 1, wherein the mechanism is embodied as a gear having a driving element on which the motor acts, a coupling element and a driven element which acts on the first axle.

3. The device according to claim 2, wherein the coupling element is arranged between the driven element and the driving element, whereby the coupling element is connected to the driving element with an articulated joint.

4. The device according to claim 2, wherein the driving element is rotatably mounted on an axle by means of which the motor initiates a rotational movement into the mechanism.

5. The device according to claim 2, wherein the driving element has activating means which act on the camera unit in a coupled operating state of the mechanism, thereby moving the camera unit from the resting position into the active position, and is at a defined distance from the camera unit in an uncoupled operating state of the mechanism.

6. The device according to claim 5, wherein the activating means are designed as a pivot arm, such that the pivot arm and the driving element are made of a same material designed as a uniform part.

7. The device according to claim 5, wherein the camera unit has a force application area on which the activation means act in a coupled operating state of the mechanism.

8. The device according to claim 7, wherein the activating means and a force application area are arranged relative to one another in such a way that in the uncoupled operating state, a movement of the protective element rom the closed position into the open position is implementable until the mechanism changes to the coupled state, and for movement of the protective element, a movement of the camera unit from the resting position into the active position is initiated with a time lag.

9. The device according to claim 8, wherein the force application area is designed as a cam which is arranged on a second axle.

10. The device according to claim 2, wherein the coupling element is guided to execute a translatory movement.

11. The device according to claim 2, wherein the coupling element is designed with a groove embodied in a linear form.

12. The device according claim 2, wherein the coupling element is additionally guided in a translatory movement on the driving element.

13. The device according to claim 2, wherein the coupling element is in contact with the driven element in such a way that by manual movement of the protective element from the closed position into the open position, the driven element is uncoupled from the coupling element without initiating any movement of the coupling element.

14. The device according to claim 1, wherein that the mechanism is arranged inside a housing unit in which a lock cylinder for a lock of a locking device is rotatably mounted, such that the lock cylinder is completely covered in the closed position of the protective element.

15. The device according to claim 14, wherein a switch element which is arranged on the housing unit can be activated by movement of the protective element and triggers a signal for electric opening of the lock.

* * * * *